US010953346B2

(12) United States Patent
Song et al.

(10) Patent No.: US 10,953,346 B2
(45) Date of Patent: Mar. 23, 2021

(54) SYSTEMS, METHODS, AND DEVICES PROVIDING SOLVENT CONTAINER IDENTIFICATION AND INCORPORATION

(71) Applicant: Waters Technologies Corporation, Milford, MA (US)

(72) Inventors: Xiangjin Song, Westborough, MA (US); James P. Murphy, Franklin, MA (US); Keith Fadgen, Hope Valley, RI (US); Wade P. Leveille, Douglas, MA (US); Joseph D. Michienzi, Plainville, MA (US); Jonathan L. Belanger, Whitinsville, MA (US); Moon Chul Jung, Waltham, MA (US); Abhijit Tarafder, Franklin, MA (US)

(73) Assignee: Waters Technologies Corporation, Milford, MA (US)

(*) Notice: Subject to any disclaimer, the term of this patent is extended or adjusted under 35 U.S.C. 154(b) by 126 days.

(21) Appl. No.: 15/873,280

(22) Filed: Jan. 17, 2018

(65) Prior Publication Data
US 2018/0207549 A1 Jul. 26, 2018

Related U.S. Application Data

(60) Provisional application No. 62/447,228, filed on Jan. 17, 2017.

(51) Int. Cl.
*B01D 15/14* (2006.01)
*B01L 3/00* (2006.01)
(Continued)

(52) U.S. Cl.
CPC .............. *B01D 15/14* (2013.01); *B01L 3/545* (2013.01); *B65D 1/0223* (2013.01); *B65D 23/14* (2013.01);
(Continued)

(58) Field of Classification Search
CPC ...... B65D 23/14; B65D 1/0223; G01N 30/26; B01D 15/14; B01D 15/08; B01L 3/545; B01L 2300/021; B01L 9/00
(Continued)

(56) References Cited

U.S. PATENT DOCUMENTS 4,254,084 A 3/1981 Blum
4,782,945 A * 11/1988 Geiler .................. B65D 1/0276
206/139
(Continued)

FOREIGN PATENT DOCUMENTS

WO 95/23328 A1 8/1995
WO 2010056884 A1 5/2010
WO 2012/167832 A1 12/2012

OTHER PUBLICATIONS

International Search Report and Written Opinion for International application No. PCT/IB2018/050293 which was issued on Mar. 29, 2018 and dated Apr. 9, 2018.

*Primary Examiner* — Steven A. Reynolds
(74) *Attorney, Agent, or Firm* — Womble Bond Dickinson (US) LLP; Deborah M. Vernon; Heath T. Misley

(57) ABSTRACT

Solvent containers and solvent container trays for chromatography systems are described for providing control over solvent supply and waste collection. Designated solvent containers and exclusively designated solvent containers provide solvents for use by chromatography systems. Control over solvent supply is achieved by requiring matched container shape and container receiving position shape within the tray, and additionally or alternatively, through solvent container coding readable by the solvent tray and chromatography system which provide information about the solvent container to the chromatography system.

5 Claims, 7 Drawing Sheets

(51) Int. Cl.
  *B65D 1/02*   (2006.01)
  *B65D 23/14*  (2006.01)
  *G01N 35/00*  (2006.01)
  *G01N 30/80*  (2006.01)
  *B01L 9/00*   (2006.01)
  *G01N 30/26*  (2006.01)

(52) U.S. Cl.
  CPC ........... *B01L 9/00* (2013.01); *B01L 2300/021* (2013.01); *B65D 2501/0081* (2013.01); *G01N 30/26* (2013.01); *G01N 30/80* (2013.01); *G01N 35/00732* (2013.01)

(58) Field of Classification Search
  USPC .......................... 206/563, 459.5; 220/23.83
  See application file for complete search history.

(56) References Cited

U.S. PATENT DOCUMENTS

| | | | | |
|---|---|---|---|---|
| 5,454,478 | A * | 10/1995 | Everson | A45C 13/02 220/23.83 |
| 5,609,282 | A * | 3/1997 | Melanson | A45F 5/02 206/338 |
| 7,726,487 | B2 * | 6/2010 | Ahmad | A61K 9/0034 206/38 |
| 2003/0136839 | A1 | 7/2003 | Knepple et al. | |
| 2013/0195326 | A1 * | 8/2013 | Bear | G06F 19/3456 382/128 |
| 2015/0287343 | A1 * | 10/2015 | Moore | B65D 77/02 340/4.14 |
| 2016/0015602 | A1 * | 1/2016 | Panzini | A61J 7/0454 340/666 |

\* cited by examiner

US 10,953,346 B2

SYSTEMS, METHODS, AND DEVICES PROVIDING SOLVENT CONTAINER IDENTIFICATION AND INCORPORATION

RELATED APPLICATIONS

This application claims the benefit of U.S. Provisional Patent Application 62/447,228 filed on Jan. 17, 2017 titled "SYSTEMS, METHODS, AND DEVICES PROVIDING SOLVENT CONTAINER IDENTIFICATION AND INCORPORATION," the contents of which are incorporated herein by reference in its entirety.

FIELD OF THE INVENTION

The present disclosure generally relates to solvent containers and solvent container trays for chromatography systems providing control over solvent supply and waste collection. In general, the present disclosure relates to the organization and control of different solvents in a chromatography system.

BACKGROUND

Chromatography systems use several types of solvents. Chromatography systems use mobile phase solvents to perform separations by establishing a mobile phase solvent flow through a chromatography column. Chromatography systems use wash solutions to clean the injection needle and sample introduction path. Chromatography systems may use other solvents, such as column flush solvents and needle wash solvents. Additionally, chromatography systems may use several types of each solvent, even within the separation of a single sample (i.e., a run). For example, a separation may consist of a gradient elution using two mobile phase solvents, while the injection needle and sample introduction path may be washed by a strong wash, then a weak wash to prepare the system for the next sample analysis.

SUMMARY

The present disclosure generally relates to solvent containers and solvent container trays for chromatography systems providing control over solvent supply and waste collection. The current disclosure provides methods and devices that enhance solvent selection and provide for greater consistency in the selection of solvents. In particular, the current disclosure provides for solvent container systems that control the provision of solvent to the system and may reduce or eliminate human error associated with selecting and providing solvent to chromatography systems.

In one embodiment, the present disclosure relates to a solvent container system including a plurality of container types (each container type including a container body describing a unique shape) and a tray including a plurality of receiving positions (each receiving position formed to correspond to one of the unique shapes). The tray may have one or more receiving positions corresponding to each of the unique shapes represented by the plurality of container types, or corresponding to each of a subset of the unique shapes represented by the plurality of container types.

In an embodiment, a device may include a plurality of solvent lines, one solvent line situated proximate each receiving position and in liquid communication with the chromatography system. Further, in an embodiment, each of the solvent lines may be exclusively interconnected with a container inserted in the receiving position proximate that solvent line.

In an embodiment, the present disclosure relates to a solvent container system for a chromatography system, including a container (including a container body and having a first shape), a tray (including a first receiving position corresponding to the first shape), and a first solvent line situated proximate the first receiving position and in liquid communication with the chromatography system.

Further, in an embodiment, a device may additionally include a container describing a second shape, and a second receiving position corresponding to the second shape, and a second solvent line situated proximate the second receiving position and in liquid communication with the chromatography system.

In an embodiment, the present disclosure relates to a container system for a chromatography system, including a tray (including a plurality of receiving positions, each receiving position describing a shape), a plurality of containers (each container comprising a container body and a being formed to correspond to one of the shapes), and a solvent line situated proximate the receiving position and in liquid communication with the chromatography system. In an embodiment, each of the receiving positions may have a unique shape, as among the other receiving positions.

In an embodiment, the present disclosure relates to a method of supplying solvent to a chromatography system including placing a solvent container (including a container body and defining a shape) into a receiving position with a tray (where the receiving position corresponds to the shape) and establishing liquid communication between the solvent container and the chromatography system.

In an embodiment, the present disclosure relates to a solvent container system for a chromatography system including a set of coded containers (each coded container comprising a container body and an identification code unit) and one or more receiving positions (each including a reader that reads the identification code). In an embodiment, the identification code unit is selected from a group consisting of a bar code, a matrix bar code, a radio-frequency identification (RFID) device, a 125 kHz or 13.56 MHz proximity device, and a contact smart chip. In an embodiment, the identification code unit is a set of tab positions.

In an embodiment, the present disclosure relates to a solvent container system for a chromatography system including a set of coded containers (each coded container including a position key, a container body, and a plurality of tab positions), and one or more receiving positions (each receiving position including a position key receiver, a plurality of tab position receivers, and a plurality of sensors positioned so as to determine the presence or absence of a tab in each tab position.

In an embodiment, the present disclosure relates to a solvent container system for a chromatography system including a set of coded containers and one or more receiving positions wherein a surface of the container includes a grid, which may be a square grid, a rectangular grid, or some other figure, where each element of the grid may be flat or protruded, or alternatively, may be flat, protruded, or indented and where each receiving position has a sensor or set of sensors configured to register the features of the elements of the grid (i.e., to determine whether elements are flat, protruded, indented, etc.).

In an embodiment, the present disclosure relates to a method of achieving solvent flow in a chromatography system including: providing a tray having a plurality of receiving positions, where each receiving position has an opening with a shape (the opening designed to receiving a solvent container having a shape which corresponds to the distinct shape of the opening), providing one or more solvent containers to one or more of the receiving positions, establishing a liquid connection between the one or more solvent containers and the chromatograph system, and providing solvent flow from the one or more solvent containers to the chromatography system.

In an embodiment, the present disclosure relates to a solvent container system for a chromatography system including a plurality of solvent containers and one or more receiving positions, wherein each receiving position describes a shape and includes a code reader that reads an identification code, and wherein each solvent container includes an identification code unit readable by the code reader, and a container body, and is configured to mate with one of the shapes described by one or more of the receiving positions.

In an embodiment, a device according to the current disclosure may have one or more sensors that measure the amount of solvent present in a solvent container loaded into a receiving position. Further, in an embodiment, the sensor used to measure the amount of solvent present may be an optical sensor or a weight sensor.

Providing identifiable and controllable solvent containers offers a number of advantages. The designated containers may be the only containers which may be placed within and used by the system. The designated containers may be provided with prepared solvents designed for use with particular separations. The designated containers may be provided exclusively with an appropriate grade of solvent and without impurities that would interfere with the operation of the chromatography unit. The containers may be designed to resist and identify tampering. In embodiments, the system can read the coding to determine the age of the solvent and ensure that the solvent has not expired. Additionally, the system may be able to use the coding to determine whether additional solvent has been added to the container. In the event that additional solvent has been added to the container, the system may be designed to refuse to use that possibly-contaminated solvent supply.

BRIEF DESCRIPTION OF THE DRAWINGS

The invention will be more fully understood from the following detailed description taken in conjunction with the accompanying drawings, in which.

DETAILED DESCRIPTION

Figure 1:
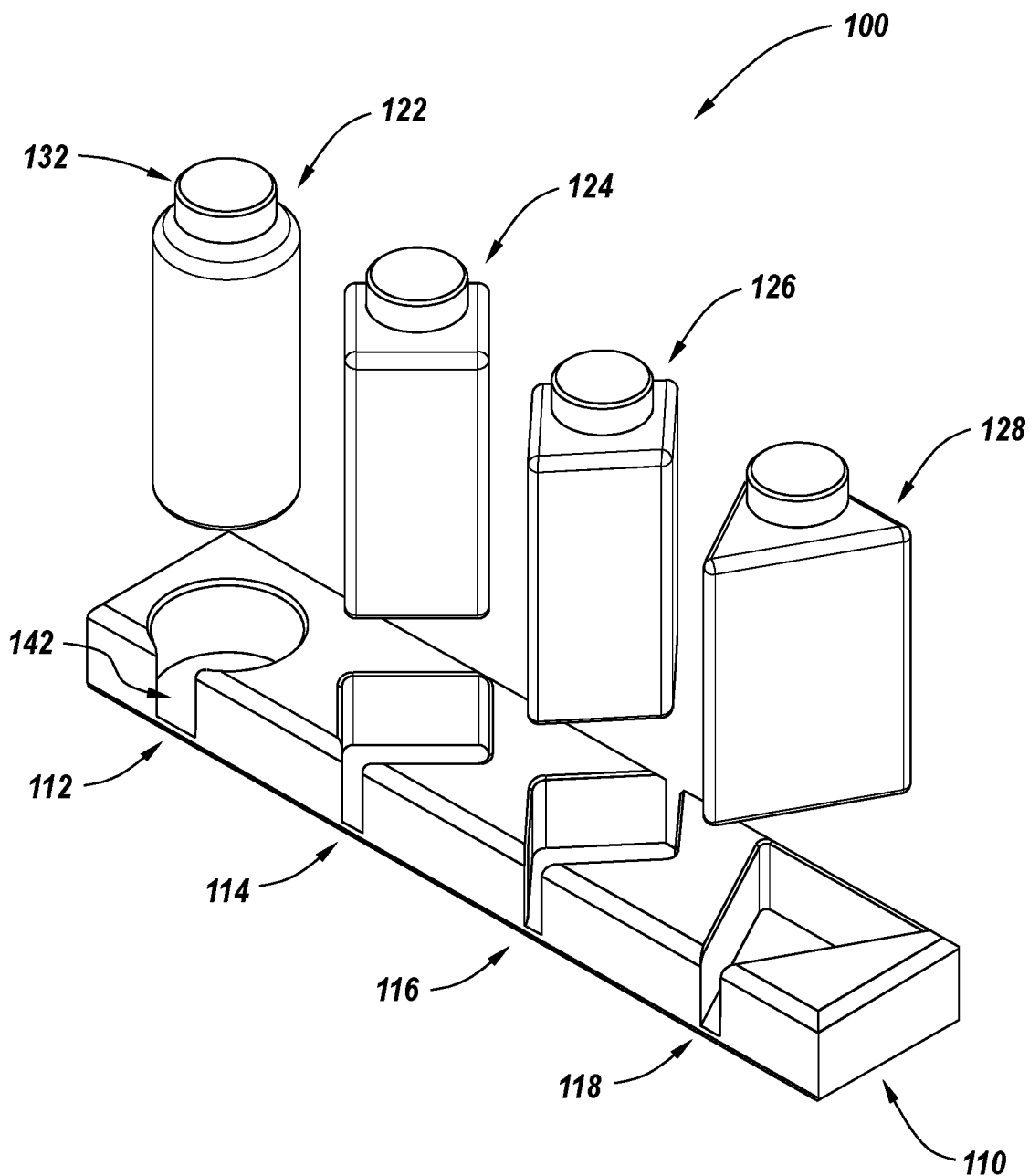
FIG. 1 shows a tray and a set of containers according to an embodiment of the present disclosure.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Solvents.

A number of different types of solvents may be desired for use in a chromatography system. For example, systems may require one, two, or more mobile phase supplies, strong and weak wash solutions, or cleaning and rinse solutions, and may require additional fluids for maintenance purposes. Within each category of solvent (e.g., mobile phase, wash solution, maintenance fluid) there may be a potentially unlimited number of solutions used for each purpose (and the same solutions may potentially be used for more than one purpose in the system). Each of the solvents in the chromatography system may itself be a single liquid solvent, a mixture of liquids, or a solution with a dissolved solute. The solvents may be used as supplied, or the user may prepare the solvent. Additionally, in applications where a system is designed to switch between different operating modes without user intervention, the system may be provided with several complete sets of mobile phase and wash solutions. For example, in order to be able to run two different gradient elutions, the system may have four mobile phase solvents. The solvent may be of any type, including aqueous and organic solvents, polar and nonpolar solvents, e.g., methanol, ethanol, acetonitrile, tetrahydrofuran, dimethoxyethane, chlorobutane, dichlorobenzene, pentanone, acetone, chloroform, cyclohexane, diethyl ether, ethyl acetate, pentane, hexane, heptane, toluene, water, and combinations of the same.

A solvent including more than one liquid component may be provided in a single container, or the liquid components may be provided separately and mixed by the system. The system may receive two or more solvents which are mixed by the system, for example, to form a mobile phase for an isocratic elution, or to serve as one component of a gradient elution.

Systems of the present disclosure provide control over a number of aspects of solvent supply to the chromatography system. The systems can provide pre-packaged solvents having different purity and quality levels to match a user's methods. The systems can ensure a correct solvent and grade of solvent is provided. For highly precise separatory and analytical instruments, such as instruments using mass spectrometry detectors, interference from contaminants within the solvent may reduce the quality of separation and analysis. Interference may be a particularly acute problem for systems that automatically match an analyte spectrum against a library to make an identification, and which may lack information about the particular solvent used. Standard laboratory grade solvents may not be sufficiently pure for such analytical instruments. Systems according to the current disclosure permit a desired grade of solvent, e.g. a highly purified solvent, to be prepared and used by the system, with identification procedures to ensure that only a desired solvent is being used. Alternatively, the system may permit the controlled use of lower-grade solvents by identifying the impurities in those solvents such that any impurities present in that solvent are known not to interfere with the separation method or analysis to be used, or such that any interference can be anticipated and corrected for by the system.

Some embodiments may track a particular unit of solvent, enabling the system to determine when the solvent was prepared and packed. Many solvents must be used within a certain period of time after preparation of the solvent. Some solvents may not be stable, especially over extended storage periods. Solvents that are solutions may experience evaporation at different rates for different components, changing the composition. Solvents may also tend to absorb water from the atmosphere over time, for example, some polar solvents such as short-chain alcohols may be particularly hygroscopic. Solvents may be photosensitive. Embodiments may provide an expiration date particular to a given solvent and container, taking factors such as these into account. The system may be designed not to use a solvent container after its expiration. In an embodiment, the system may identify a particular container on its initial use and may record the date and time of use so that the system can identify when the solvent passes an expiration date and the system may alert the user to replace the container with a fresh solvent container.

Systems of the present disclosure may support the provision of solvent in containers of an appropriate type for that solvent. For example, a photosensitive solution may be available only in an opaque container. Since the system determines the container in which the solvent is provided into the system, the system may be designed so that a user cannot transfer a solvent into an inappropriate container and then attempt to use the solvent later.

The current disclosure also provides identification so that the system can identify whether an appropriate solvent container has been provided. Additionally, the chromatography system may confirm the identity and quality of the solvents provided to the system. The system may alert the user to an incorrect solvent, or be designed not to operate with an incorrect solvent. Or, the system may be designed to present information to users as a trouble-shooting feature based upon known information about the solvents used.

Consistent quality of solutions may improve comparability of results achieved on different instruments and at different times. Users of chromatography systems may wish to compare results obtained at different times or in different laboratories. Consistent solvent supply in accordance with the current disclosure may provide greater confidence in standardized procedures and comparative analyses. The containers may provide solvents of a certain grade, for example, solvents that are greater than 90%, 95%, 96%, 97%, 98%, 99%, 99.5%, or 99.9% pure. The systems may provide consistency between containers of each solvent, such that the difference of (i) the purity of a container ($P_1$) from (ii) the purity specified for that solvent ($P_o$), is less than 2%, 1%, 0.5%, 0.25%, or 0.1%, where Difference=$|P_o-P_1|$.

Chromatography System.

The current solvent systems may be used with a number of chromatography systems, such as liquid chromatography (LC), high performance liquid chromatography (HPLC), highly-compressible fluid chromatography (sometimes referred to as supercritical fluid chromatography (SFC), or $CO_2$-based chromatography where $CO_2$ is used in the mobile phase). In addition, the chromatography systems for which the current solvent system may be used may include a range of detectors. For example, the detector may be an ultraviolet/visible light (UV-Vis) detector, a refractive index (RI) detector, a conductivity monitor, a flame ionization detector (FID), an atomic absorbance spectrometer (AAS), or a mass spectrometer (MS). Use of the present solvent systems may be particularly beneficial to highly sensitive detectors, such as mass spectrometers, for which interference from contaminants within the solvent may be more problematic.

Tray and Receiving Positions.

Receiving position refers to the portion of the tray that receives the container. The receiving position reflects the unique shape of the container, or a portion of the container. The receiving position may be a inset portion of the tray into which the container is mounted, such as a hole in the tray.

A tray is a portion of the system that contains one or more receiving positions. The tray may be a fixed portion or may be removable and replaceable. The tray may be made of plastics (e.g., acrylonitrile butadiene styrene (ABS), polyvinyl chloride (PVC), high impact polystyrene (HIPS), high density polyethylene (HDPE), low-density polyethylene (LDPE), polyethylene terephthalate (PETE), polypropylene (PP)), metals, glasses, or ceramics.

Some embodiments may have more than one tray, and may have trays in different locations within the system. For example, a system may have a tray with solvent containers situated on a surface above the chromatography system, and may have a second tray with waste solvent containers situated below the chromatography system, to facilitate gravity feed.

Unique shape, as used herein, is one shape of a set of shapes used in the system such that a container, or a portion of a container, having that shape may be exclusively inserted into a receiving position having a corresponding shape, and the container with that shape may not be inserted into a receiving position having any other shape within the set of shapes. The shape may be a common geometric figure, e.g., circles, ellipses, triangles, squares, rhombuses, trapezoids, pentagons, hexagons, heptagons, octagons, etc. Where the shape is a visually distinctive shape, such as common geometric figures, the user may more readily recognize and match appropriate shapes than where shapes are unusual. The entire container or a portion of the container may describe the shape. For example, an otherwise cylindrical container may have a square bottom portion and thus define a square shape, where the square bottom portion is the portion that engages with the receiving position. Where the shape is not at the bottom, the shape may be on any other side, such as a square protrusion from the side of a container where that side engages with the receiving position.

Trays according to the present disclosure may also be provided with a sensor at some or all of the receiving positions, where the sensor may determine the amount of solvent present in the container at that receiving position. For example, the amount of solvent present in a container could be determined by an optical device which passes a beam of light through a transparent or translucent container at one or more points along the height of the container to determine the height of the solvent present, if any, in the container; or by a weight sensor in the receiving position that determines the amount of solvent remaining by weight. Alternatively, rather than determining the amount of solvent in a container by measurement, the system could track how much solvent a given container has provided and calculate the amount remaining, as the difference of the container volume and amount provided.

Embodiments that may measure the amount of solvent remaining in a container may determine how many runs the available solvent can provide using information about the amount of solvent required for each run. In a setting where the system is in regular use, the system may also be able to estimate the amount of time before the solvent is depleted, assuming a rate of use. This information may then be provided to the user so that the user may obtain additional solvent. Alternatively, the information could be provided to an external or centralized location, such as a solvent provider or a purchasing office, so that additional solvent may be obtained.

Providing identifiable and controllable solvent containers provides a number of advantages. The designated containers may be provided exclusively with an appropriate grade of solvent and without impurities that would interfere with the operation of the chromatography unit. In certain embodiments, the system can use the coding to determine the age of the solvent and ensure that the solvent has not expired. Additionally, the system may be able to use the coding to determine whether additional solvent has been added to the container. In the event that additional solvent has been added to the container, the system may be designed to refuse to use that possibly-contaminated solvent supply. For example, a system according to an embodiment of the present disclosure may identify whether solvent has been added to the container in the following way: as the solvent container is used, the system may record that amount of solvent used for a given run, thereafter, whenever that partially used solvent container is reintroduced, the solvent volume may be measured, in an embodiment so equipped. This measurement can then be compared to the record showing the amount of solvent used to determine whether any solvent has been added. The record showing the amount of solvent used may be kept in several ways: in an embodiment where the identification code unit is a memory device, the record may be kept in that memory; in an embodiment in which each individual container has a unique identifier, e.g., a serial number, a record for that identifier may be made in a database accessible to each instrument.

In an embodiment, the system may be provided with an automated mechanism for placing solvent containers within receiving positions. For example, the system may be provided with a robotic arm which may place containers within designated receiving positions. Correct placement of containers by the robotic arm may be confirmed by use of the present technology, since only the designated solvent containers may be placed within designated receiving positions in accordance with the present technology. For example, the robotic arm may be actuated to retrieve a solvent container from a storage unit or shipping container and may then place the container within a receiving position. Use of an automated system to place solvent containers may permit extended operation of the system without user intervention, allowing for "lights-out" operation of the system, and reducing opportunities for user error.

Container Design.

A given container may be constructed of a single piece, such as container 122 of FIG. 1, or may be constructed of two or more pieces, such as containers 405, 480, and 490 of FIG. 4. Container 405 is made of three pieces, a cap 410 with a center solvent tube 412 and a position key segment 414, a container body 420 (i.e., a universal container body) with position key segment 424, and a bottom 430 with a position key segment 434 and a single tab 436. Container 480 has a triply-tabbed bottom. Container 490 has a septuply-tabbed bottom.

One of ordinary skill in the art will appreciate that a multi-part container assembly may be favored or disfavored for certain embodiments. For example, the use of different pieces may offer increased ease of processing and may reduce volume occupied by an inventory of containers. Conversely, single-piece construction may simplify assembly and reduce the possibility of tampering with the containers, e.g., mating a container body containing one solvent with a container bottom indicating another solvent.

The shape may be formed by the entirety of the container or a portion of the container, where either the entire container or the portion thereof bears the unique shape and is configured to engage with the receiving position. For example, the bottom of a container may define the shape. Using the bottom of the container to describe the shape permits gravity to hold the container in place when the container sits in the receiving position. Alternatively, the shape may be described by the top of the container, such that the container is slid, or otherwise mounted, into and held by the receiving position of the tray from the top part of the container. Alternatively, the sides, or any other portion of the container or the entirety of the container may define the shape.

As used herein, container may refer to the entirety of the container unit. Occasionally, container may be used to refer only to the portion of a multi-piece container that contains the solvent itself, i.e., the container body. A container type is the set of containers having a common shape. For example, a mobile phase container type with a circular cross-sectional shape. The container may be made of a single material or of more than one material, particularly when the container is of multi-piece construction different pieces may be made of different materials. The container components, such as the container body and separate base or lid, if so equipped, may be made of plastic (e.g., HDPE, LDPE, PETE, PP, polycarbonate (PC), polyether ether ketone (PEEK), polytetrafluoroethylene (PTFE)), glass (e.g., borosilicate, quartz, soda-lime, brown), metal (e.g., aluminum, steel, stainless steel). One of ordinary skill in the art may appreciate certain benefits of combinations of the materials for multi-piece container construction, for example, a HDPE container body with a PP base portion or lid. For higher pressure applications, materials such as PC or PEEK may be referred. Where flexibility of the container is desired, LDPE, HDPE or PETE may be preferred. Multi-piece container construction may be preferred where the container body is to be made from a material that is not readily molded into a desired shape, such that a standard shape may be used for the container body and the irregularly-shaped portion may be made from an easily-moldable material.

The container may be constructed of a single piece, such as container 122 of FIG. 1. Container 122 is a solvent container with a circular shape and having a cap 132. With respect to container 122, the shape is maintained throughout the height of the container, such that any cross section of container 122, with the exception of cap 132, has approximately the same shape, which is the circular shape corresponding to the circular shape of receiving position 112. As shown, the circular shape of receiving position 112 is unique as among the four receiving positions of tray 110. The remaining receiving positions are: square receiving position 114, rhombus-shaped receiving position 116, and triangular receiving position 118. These correspond, respectively, to square container 124, rhombus-shaped container 126, and triangular container 128. These shapes are all unique as among the receiving positions of tray 110. That is, there is only one circular receiving position, one square receiving position, one rhombus-shaped receiving position, and one triangular receiving position.

The size of the container may be determined based upon such factors as the rate of solvent use, the period to expiration for the solvent, size of the system, and so on. For example, the solvent container body may contain 10 mL, 25 mL, 50 mL, 75 mL, 100 mL, 200 mL, 300 mL, 400 mL, 500 mL, 750 mL, 1 L, 1.25 L, 1.5 L, 1.75 L, or 2 L. Other embodiments, which may be used, e.g., for preparatory systems, may use containers with larger solvent capacities, such as 2 L, 3 L, 4 L, 5 L, or 10 L. A system may use a variety of different solvent container sizes. For example, providing a smaller size container for solvents that are used less frequently or that should be replaced more frequently. Solvent container sizes may be established based upon solvent requirements of a certain separation. For example, in an embodiment that is primarily operated in a gradient elution mode where the proportion of Mobile Phase B in the mobile phase flow averages about 25% over the course of a run, balance Mobile Phase A, the system may use a set of containers where the Mobile Phase A container is about three times the size of the Mobile Phase B container.

Additionally, the container and solvent lines may be provided with mutually compatible fittings, designed such that a container so equipped may be connected to a given solvent line. Where the solvent line and the receiving portion are at the same location, the shape may provide the same result.

Waste solvent containers may also be provided in embodiments of the present disclosure. Using designated waste containers in the system may provide a number of advantages. For example, the system may know the volume of the container and the amount of each solvent provided to it and may be designed to avoid overfilling the waste container by stopping operation of the chromatography system as necessary and instructing the user to replace the waste container. The system may then provide the user detailed information about the contents of the waste container, including the identity and quantity of waste present. Systems may additionally provide specific disposal instructions to the user based on the contents of the waste container so that the user may ensure proper waste treatment. Proper waste disposal may be dictated by safety considerations and industry best practices. In some contexts, municipal or other governmental regulations govern the proper disposal of waste. Instructions given to the user could be specialized to reflect regulatory requirements of a particular location, or policies and practices of a company or institution. In embodiments where the system is aware of the solvents present and proper waste disposal for those solvents, the system may offer specific instructions. For example, the system may instruct the user that the contents of the waste container may be safely disposed of in the municipal sewer system. Or, the system may instruct the user to add the waste to a particular type of waste stream (e.g., an aqueous waste stream, an organic waste stream, a biohazard waste stream). Or, the system could instruct the user to place the waste container into appropriate secondary containment for later treatment. The system could track waste to be collected and the time of collection. Or, the system could instruct the user to contact a waste disposal provider to collect the container and could provide instructions for that provider. Alternatively, the system may communicate directly with a waste disposal provider to schedule waste retrieval. In these ways, use of the present disclosure may improve waste treatment processes and may avoid added costs arising when wastes are not adequately tracked, such as identifying and disposing of mixed streams of waste, and possible liability for violation of waste disposal regulations.

Solvent Lines.

Solvent lines as used herein are any conveyance through which the solvent may be removed from the container and transported to the chromatography system for use in the chromatography system. The solvent line may be, e.g., tubing (e.g., copper, stainless steel, PEEK, PETE), having a diameter of about 2 mm, 1.75 mm, 1.5 mm, 1.25 mm, 1 mm, 0.9 mm, 0.8 mm, 0.7 mm, 0.6 mm, 0.5 mm, 0.4 mm, 0.3 mm, 0.2 mm, 0.1 mm, 0.05 mm, or about 0.025 mm. The solvent line may be flexible or rigid. The solvent line may be fixed or movable. The solvent line may be a permanent component of the system or the solvent line may be replaceable. The solvent line may be a single piece connecting the solvent container to the chromatograph system, or the solvent line may include several segments, including, e.g. connectors, support members, and tubing sections. The solvent line may also be a zero-volume connection established at the point of interconnection of the solvent container and the system. In embodiments, a solvent line may be designed so that connection is only possible between that solvent line and a container at a particular receiving position. For example, the solvent line may be a length of tubing held within a movable support arm, where the support arm limits the freedom of motion of the length of tubing.

A number of methods may be used to avoid user circumvention of the system by inserting a solvent line into a container that has not been installed in the receiving position corresponding to that solvent line. For example, the solvent connection may be made at the point where the container and receiving portion meet (i.e., where the shape is defined in the container and receiving position), such that the container must be inserted there to be used. Alternatively, the means of connection may not permit insertion to another point, for example, if the solvent feed line is a sufficiently short piece of tubing that it lacks length to reach a container outside the designated receiving position. In another alternative, each solvent line may terminate in a fitting and each designated container may have a fitting which corresponds to the fitting of the appropriate solvent line and not to fittings on other solvent lines. In such a system, connection may be made only between the matched fittings of the corresponding solvent line and containers.

In an embodiment, the solvent line may be designed to automatically connect with a solvent container. For example, a solvent line may be on a motorized rigid assembly which may be alternatively rotated or withdrawn from the receiving position to permit removal or placement of a solvent container, and may then be rotated or replaced to achieve connection with the solvent container. Alternatively, in embodiments using a robotic arm, the arm may be designed to complete the connection of the solvent line to a solvent container.

Key-Type Container Systems.

As used herein, key-type or shape exclusion systems are those that do not permit the user to place a container in a receiving position of a tray unless the shape of the container, or a portion of the container, matches the shape that the receiving position is designed to receive. Alternatively phrased, the shape of the container, or portion of the container, may correspond to the shape of the receiving position. For example, a circular container (i.e., a container having a circular cross-sectional shape) could be placed in a receiving position with a circular shape. Additionally, a container with a circular portion could be placed within the receiving position with a circular shape, even if the remainder of the container described a different shape (e.g., a container body shaped as a cube, but with a base having a circular shape). As used herein, the shape dictates whether a container may be inserted into a receiving position, that is, while a sufficiently small container of the wrong shape could conceivably fit within a given receiving position, such a configuration is not appropriate to the current disclosure because it does not provide differentiation based on shape.

The key-type approach offers additional advantages over a code-type system alone. For example, shape exclusion can increase the ease with which the user may identify and replace containers, and organize inventory of containers, since visual identification of the containers is readily made. For example, shape exclusion provides visual information without the problems associated with inks that may wash from containers or labels. For this reason, it will be appreciated that even though only a portion of the container may need to have a unique shape, forming the entire container in some identifiable shape may further increase ease and accuracy of visual identification by the user. Additionally, shape exclusion systems help avoid contamination which may result from loading an incorrect containers, due to leakage or other failures, even if the system does not use the solution in accordance with a coding process. Additionally, shape exclusion may reduce the ability of the user to modify the system or override confirmation procedures.

Code-Type Container Systems.

Coded systems permit the system to identify the container that has been placed into a receiving position. Specific examples of coding systems are provided below. Generally, coded systems may use any form of coding that permits the system to identify the container (either the type of container, the specific container, or both). With a coded system, the tray and chromatography system may "read" the container to obtain information about the container, which may include information about solvent type, and may also include date of solvent preparation, solvent lot number, container serial number, amount of solvent remaining, details of method using the solvent, safety data, disposal data, and other manufacturer- or user-provided information. Some or all of this information may then be read by the system and the system may use the data to control whether and how the system is operated, for example, the system may refuse to operate with an incorrect solvent. Additionally, in certain embodiments, additional data about the solvent container may be available through a database external to the container. For example, the container may encode a container-specific serial number, and that number may be used to obtain other data (e.g., date of preparation, safety data, amount of solvent remaining, etc.) from a database on the instrument or online. The system may use information about solvent age to determine whether the solvent is expired and the system may be designed to refuse to operate with expired solvent.

The coding process may be achieved in a number of ways, for example, the identification code unit may be an optically readable code (e.g., a bar code (such as a UPC barcode), or matrix bar code also known as a QR Code™), a radio-frequency identification (RFID) device, a proximity card technology, or may be operated by contact, such as a memory card, or other storage medium requiring a physical connection between the storage medium and the receiver, or through a tabbed coding system, a pin sensor array, or an optical sensor. That is, the identification code unit may be, e.g., a bar code, a matrix bar code, a radio-frequency identification (RFID) device, a 125 kHz or 13.56 MHz proximity device, or a contact smart chip. An identification code reader is the device which may obtain the identification code from the identification code unit.

Where the system is a tabbed coding system, the identification code unit can be, for example, a series of tab positions, each of which may contain a tab, such that the identification code is conveyed by the presence or absence of a tab in each position. A tab position is a location on a solvent container which encodes an identifying mark by the presence or absence of a tab. Sensors of the receiving position are deployed to determine the presence or absence of a tab in each tab position which provides identifying data. A tab is a portion of material connected to a container at a tab position and used for identification of the container.

A position key is a component of the solvent container and of the receiving position that orients the two relative to each other. That is, the position key requires that the position key portion of the solvent container align with the position key receiver of the receiving position. For example, the position key on the solvent container can be a protruding segment, and that protruding segment can match an inset position key receiver of the receiving position. In a multi-piece container assembly, the position key may additionally be used to require a certain orientation of each of the pieces of the container.

In one embodiment, the coding method may be a bottom sensor coding system (BSCS) based upon a tab structure built into the solvent container. For example, the base of the container may be designed to have one or more tab positions. The base may be molded as a single piece with the container body, or may be made separately and then be permanently attached, or may be removable and interchangeable. This tabbed bottom may then be removably mated with the receiving position, where the receiving position has receptors that identify whether a tab is present at each tab position.

The sensors used in the BSCS may be any type of sensor which may identify the presence or absence of a tab, for example, a pressure sensor, an optical sensor, a gravity sensor, or an electric circuit sensor. The sensor may be activated by a pin or secondary tab on the bottom of the receiving position (opposed to the tab), or on the sides of the receiving position, or located in various positions wherein the receiving position may contact the container.

The number of tab positions used may be based upon the number of unique identifiers expected to be required, for example, consistently with the number of solvents to be produced. Since each tab position has two modes (tab and no tab), the number of containers which may be uniquely coded is $2^n$, where n is the number of tab positions. For example, a 7-tab position system supports 128 unique positions.

In order that the tab positions be properly identified, the container may be designed so that it can only be inserted in the receiving position in a single orientation. This may be accomplished in a number of ways, for example, by having an additional tab position with the corresponding tab being a different size and/or shape than the others, or by having the container be shaped in such a way that only one orientation is possible. In an embodiment, a dedicated position key may be added. Although the position key is an optional feature, certain types of coding systems may require a means to orient the solvent container so that the code may be read. For example, when coding is provided by an RFID-type device, orientation may not be necessary to read the coding. Where a tab system is used, some positioning means may be required, either by a separate position key, or by a position key provided by the structure of the container itself, e.g., where such a structure is one that only admits of the appropriate orientation. For example, a figure with irregular side lengths which may only be inserted into the receiving position in a particular orientation. Without this orientation, the system may fail to read the tabs correctly.

The optional position key segments appearing in the containers of FIG. 4, such as position key segments 414, 424, and 434 may serve at least two functions. Firstly, the position key segments ensure that the pieces of the container are assembled in the proper orientation and, secondly, that the entire container is placed within the receiving position in the correct orientation. This ensures that the tabs are appropriately aligned so that the tabs of the container engage the correct tab sensors in the receiving position, and the receiving position is able to determine the presence or absence of a tab in each tab position correctly. As depicted, position key segment 424 provides additional volume to container body 420. This feature is optional, and the position key segment 424 may alternatively be made of a solid piece of the container material not providing additional volume to the container body. Additionally, in other embodiments, only base 430 contains a position key segment 434 while the lid 410 and the container body 420 do not. This embodiment may be used where all sides of the lid 410 and container body 420 are interchangeable. In such an embodiment, having a position key segment in the base alone may be sufficient to ensure that the tabs register in the correct position within the base.

Another code-type system uses a grid. The grid is designed within a surface of the container and is a figure subdivided into some number of elements. For example, a square grid measuring eight elements by eight elements has a total of 64 elements. Each of the elements may then have a structure. For example, the elements may be flat or protruded. In another system, the elements may be flat or indented, or may be flat, protruded or indented. The receiving position may be constructed to correspond to the grid by having sensors corresponding to each of the elements, and able to determine the structure of each element, i.e., whether each element is flat, protruded, indented, etc. In these systems, the grid may be selected in order to obtain the required number of elements. The number of combinations (where the grid is held in a single orientation, i.e. not rotated), can be equal to the number of alternative structures (i.e., flat structure and protruded structure provide two alternative structures) raised to the power of the number of elements. For example, in a system with two structures for each element (i.e., flat or protruded) and a 64-element grid, the number of unique grid structures is $2^{64}$.

It may be appreciated that the grid may readily be scaled in order to provide more elements, as with a larger grid, more densely arranged elements, or both, and therefore the ability to have more containers with unique grid structure or to code more information into the grid structured. Further, the shape of the grid itself may be used. For example, in a given system, a container with a square grid may be used to correspond to a square receiving position (and additionally to provide the information encoded within the grid), while another container in the system may have a rectangular grid which corresponds to a rectangular receiving position. Certain figures may permit grids of different shapes to provide the same number of elements so that the same amount of content may be coded with the grid. For example, in the system described previously, the square grid could be eight by eight, providing 64 elements, while the rectangular grid could be four by sixteen also providing 64 elements. This system may be extended to shapes which are not themselves amenable to a rectangular grid by inscribing the figure of a rectangular grid within the shape, for example a triangle inscribed with a rectangle, where the rectangle forms the grid while the triangle matches the triangular receiving position.

Alternatively, a grid-type system may be formed of any figure with any subdivision of elements within the figure, not limited to rectangular elements within rectangular figures. Certain combinations of element shape and grid shape may provide more efficient packing of elements, such as a circular figure divided into pie-shape elements or a trapezoidal figure divided into trapezoidal elements, and so on. Alternatively, the elements may be located at irregular positions within the figure and the elements may have irregular shapes, such as various circular elements located within a larger rectangular shape.

An embodiment of a grid-type system may include visual sensing through an optical reader or camera. For example, a grid could be formed as a portion of the container or on a label affixed to the container in a particular location on each container to permit reading of the grid by the optical reader or camera. The grid itself could be a square, such as an 8×8 grid made up of 64 square units. Alternatively, the grid or the units could have other shapes. The units may have a particular color or opacity readable by the optical reader or camera. For example, the units could be either clear or opaque, such that the grid is formed of a particular pattern of clear and opaque units forming a pattern readable by the optical reader or camera.

The elements themselves may also be designed to provide more data storage. For example, rather than measuring only whether an element is protruding or flat, i.e., a binary measurement, the system could measure the amount of protrusion, i.e., the height of the raised figure. Further, the shape of the element may be elaborate, such as indents forming a pyramidal or spherical void, or voids of some other shape.

An embodiment of a code-type system uses a pin sensor array wherein the receiving position is provided with an array of pins with each pin having a range of motion and a connected sensor. When no container (or other object) is present within the receiving position, each pin can be extended along its range of motion. A pin sensor array may be coupled with a series of containers having various structural features, i.e. protrusions, indentations, a grid, etc. When a container is placed within the receiving position, some or all of the pins may be depressed along their range of motion in opposition to the structural features of the container. The sensors may then determine the position of the pins in order to measure the structural features. The pins may be restored to their extended position by a spring, a motor, gravity, etc. It may be appreciated that the pin sensor system may support a very large number of different containers. The number may be increased by increasing the size of the array, the density of pins within the array, the depth of the range of motion, and the precision with which the range of motion is measured. For this reason, pin sensor arrays may be useful for systems which are expected to have a large number of containers.

Optionally, a pin sensor array may be made with pins which are connected to a drive mechanism, e.g., a servo motor, a magnetic drive, etc., such that the pins, in addition to reacting to an object placed in the receiving position in order to make a measurement, may refuse to accept an inappropriate container. For example, if a wash solvent container is placed with the mobile phase solution receiving position, the pin sensor array in the mobile phase solution receiving position may initially deform to identify the wash solvent container. After identifying the wash solvent container and determining that the wash solvent container is not appropriate to the mobile phase solution receiving position, the drive mechanism of the pin sensor array may be activated in order to eject the errant wash solvent container.

Additionally, an optical sensor may be used with or in place of these systems to identify a container placed within a receiving position. For example, an optical sensor may be placed within a receiving area and may obtain an image of the solvent container. Image processing software may then be used to read the image, for example by converting the image into a two-dimensional representation of the container. The two-dimensional representation of the container may then be compared to known containers to identify the container.

The use of an optical or photographical type sensor may be particularly useful for coding system which have a very large number of possible alternative structures as the optical or photographical system would permit reading these structures without requiring as many sensors as would be necessary to read each element independently. An optical sensor may also be coupled with other sensors to provide alternative or supplemental means of storing data in the container.

Coded systems independent of key-type systems have some different advantages. Coded systems permit easier modification, for example, where a user wishes to change the system or new solvents are offered. Since the system may be designed not to operate with incorrect solvent, a code alone may ensure proper solvent use, even though the solvent container may be physically placed within an incorrect position.

A coded system could be designed to recognize a new solvent and automatically, or with user approval, download information about that new solvent. Or the system could instruct the user to obtain the necessary information about the solvent and input it. In some cases, the coding system itself may contain the necessary information, for example, if the coding system is a memory card. The memory card could contain information about the solvent and could provide additional separation methods for that solvent.

One of ordinary skill in the art will appreciate that various coding methods have different advantages to the present disclosure. For example, readable codes, such as bar codes, may be applied using ink, either directly to the container, or on a sticker attached to the container. This approach is convenient and cost effective. Additionally, the same label or sticker containing the barcode could also contain a visual label for the convenience of the user. However, some solvents used in chromatography may dissolve inks commonly used on such barcodes. Additionally, the solvents may dissolve the glue used to fasten a sticker. Electronic means may work in certain other applications. However, these electronic means do not assist the user in visually identifying the appropriate container.

Combined System.

Where key- and code-type systems are used together, the two systems may offer primary and secondary levels of solvent differentiation. For example, in one embodiment, a range of mobile phase solutions may be made available, each in a circular container, and additionally each with a differently tabbed key. The receiving tray may be designed where a circular receiving position is always used for the mobile phase while a square receiving position is used for, e.g., the strong wash. In that case, the circular container represents a mobile phase container (i.e., the primary level of solvent differentiation). The user is unable to place a circular mobile phase container in the strong wash receptacle. Conversely, the user is unable to place a square strong wash container in the circular mobile phase receptacle. However, the user could provide any of the circular mobile phase containers to the system. Then, the system could use the coded system to determine which container type (and solution) have been provided. For example, the tabbing system may indicate that the mobile phase provided is, e.g., methanol, (i.e., the secondary level of solvent differentiation).

In embodiments, a grid-type system may be combined with a key-type system. For example, some or all of the grid positions may be fixed within the receiving position so that a container grid that does not match those grid positions is physically excluded from the receiving position.

FIG. 1 depicts a shape-exclusion container system 100 having four containers. FIG. 1 shows a tray 110 for four containers with receiving positions that are: a circle 112, a square 114, a rhombus 116 (i.e., a non-square rhombus), and a triangle 118. Also shown in FIG. 1 are four corresponding containers, a circular container 122, a square container 124, a rhombus-shaped container 126, and a triangular container 128. Each container has a cap corresponding to cap 132. System 100 additionally shows an optional feature where aperture 142 is formed in tray 110, and a like aperture in the other receiving positions, permitting an optical sensor to determine the level of solution present in the solvent container.

Figure 2:
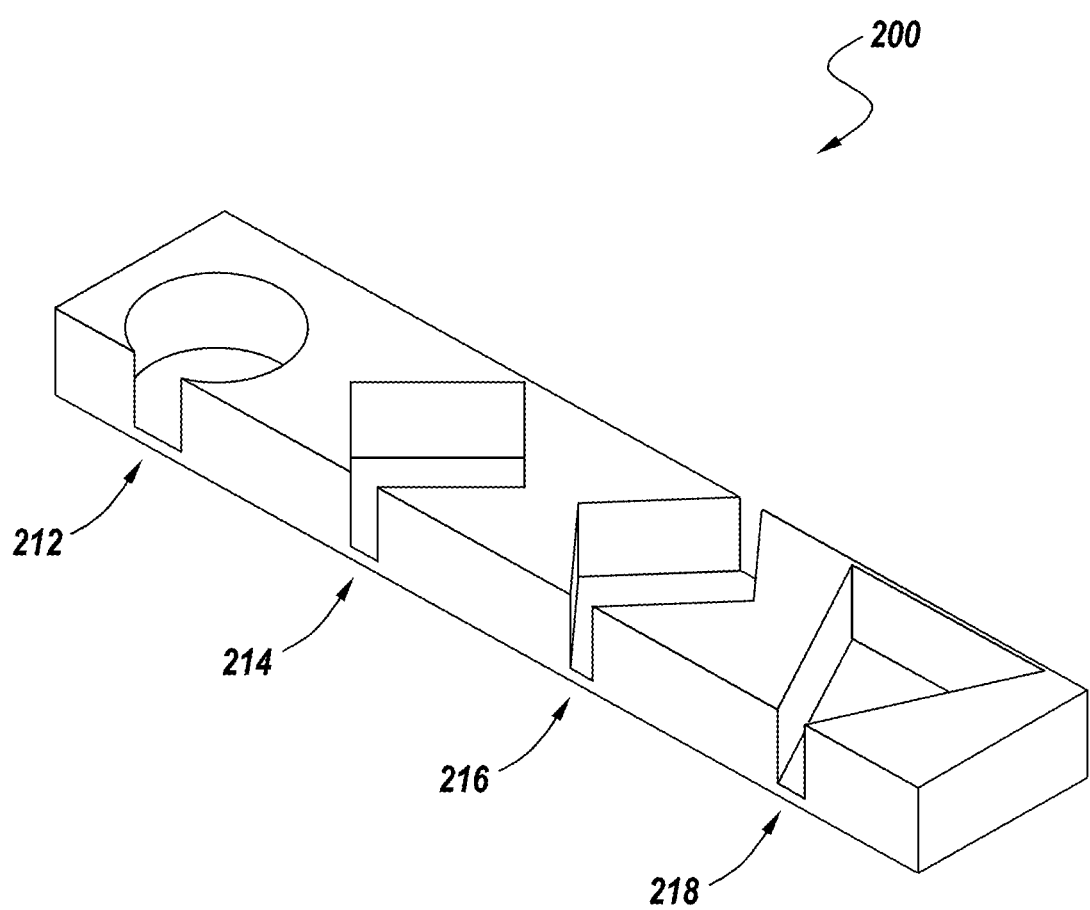
FIG. 2 shows a tray according to an embodiment of the present disclosure.

FIG. 2 shows a tray 200 with four receiving positions designated: receiving position 212 for Mobile Phase, receiving position 214 for Aqueous Solution, receiving position 216 for Wash Solvent and receiving position 218 for Rinse Solvent.

Figure 3:
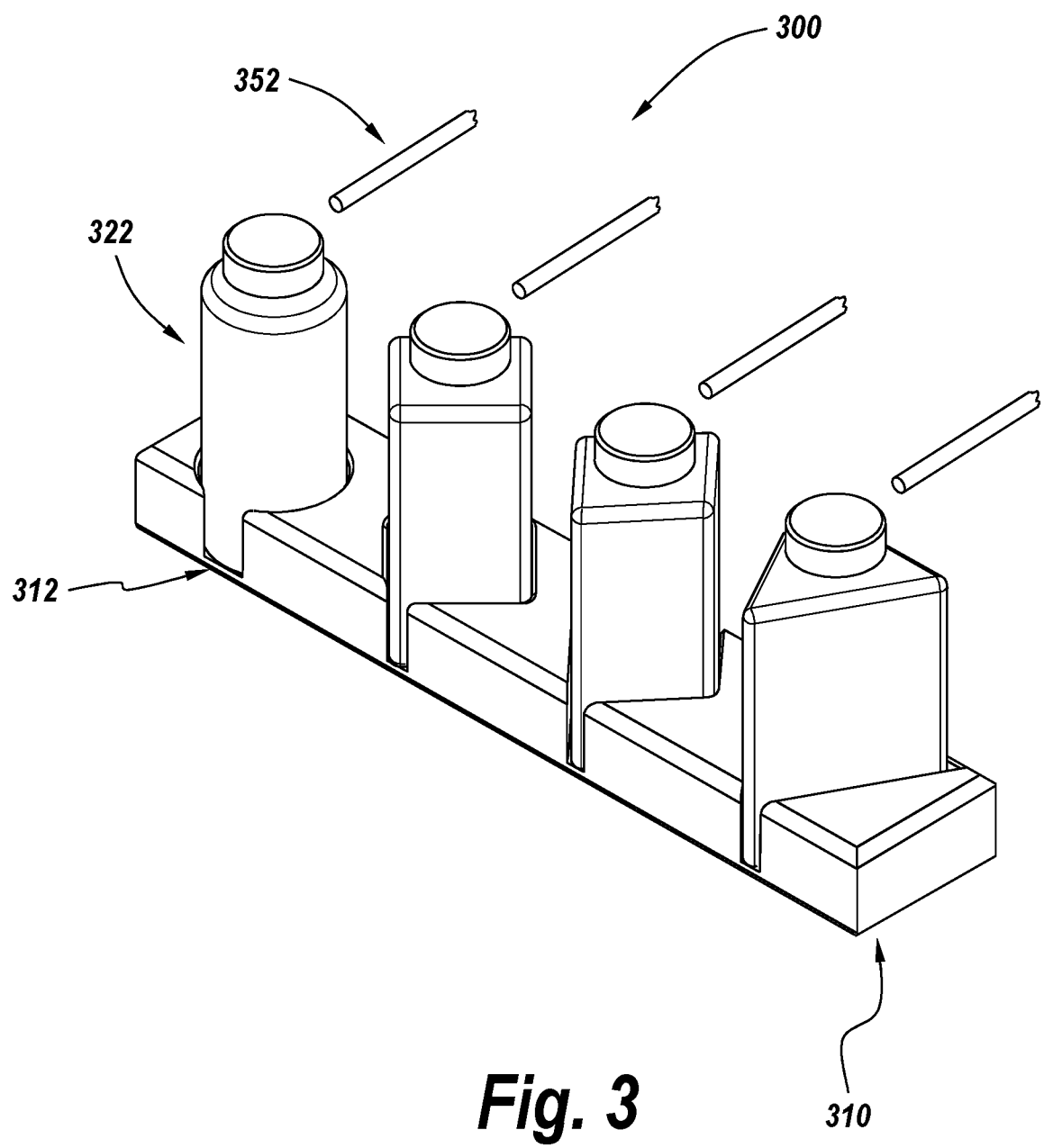
FIG. 3 shows a tray, set of containers, and feed lines according to an embodiment of the present disclosure.

FIG. 3 shows solvent container system 300 with tray 312. System 300 shows solvent lines configured proximate the solvent containers in each receiving position. For example, when container 322 is placed in receiving position 312 of tray 310, solvent line 352 is proximate container 322. As shown, solvent line 352 is fixed such that it can only be used to draw from container 322.

Figure 4A:
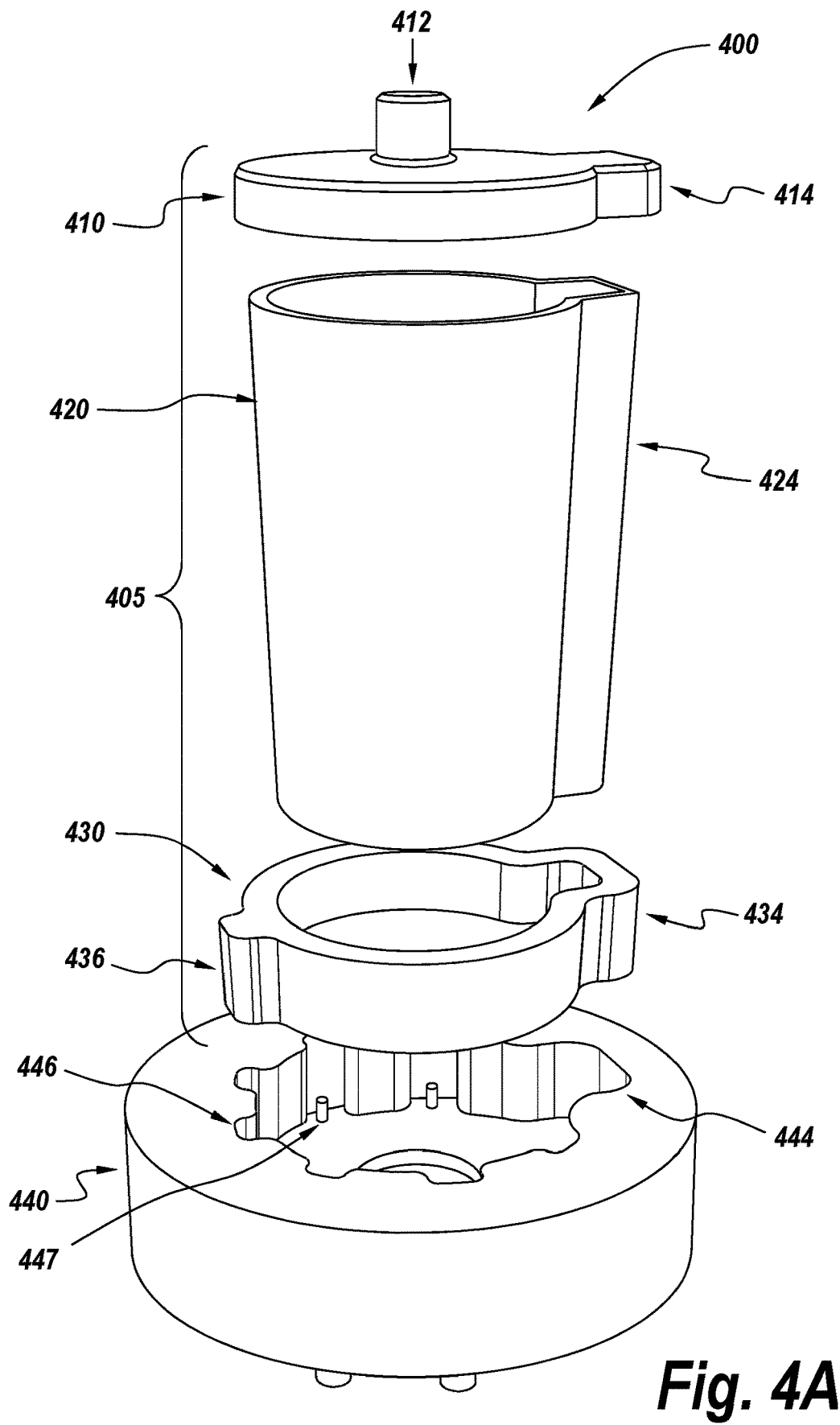
FIG. 4A shows a container with a replaceable bottom having one tab and a base according to an embodiment of the present disclosure.

FIG. 4A shows a code-type container system 400. System 400 uses a multi-piece container construction such that the container is made from lid 410, container body 420, base 430. Lid 410 has a center inlet 412 and a position key segment 414. Container body 420 has a position key segment 424. Base 430 has a position key segment 434 and a tab 436. FIG. 4A also shows receiving portion 440. Receiving portion 440 has a position key receiver 444, tab position receivers 446 and pins 447. When base 430 is inserted in receiving position 440, position key segment 434 must be inserted into position key receiver 444 for base 430 to enter receiving portion 444. When base 430 is inserted, the single tab 436 of base 430 can engage a pin 447 corresponding to the tab position receiver 446, which corresponds to the single tab 436. It should be noted that there are seven possible one tab positions (in a 7-tab position base).

Figure 4B:
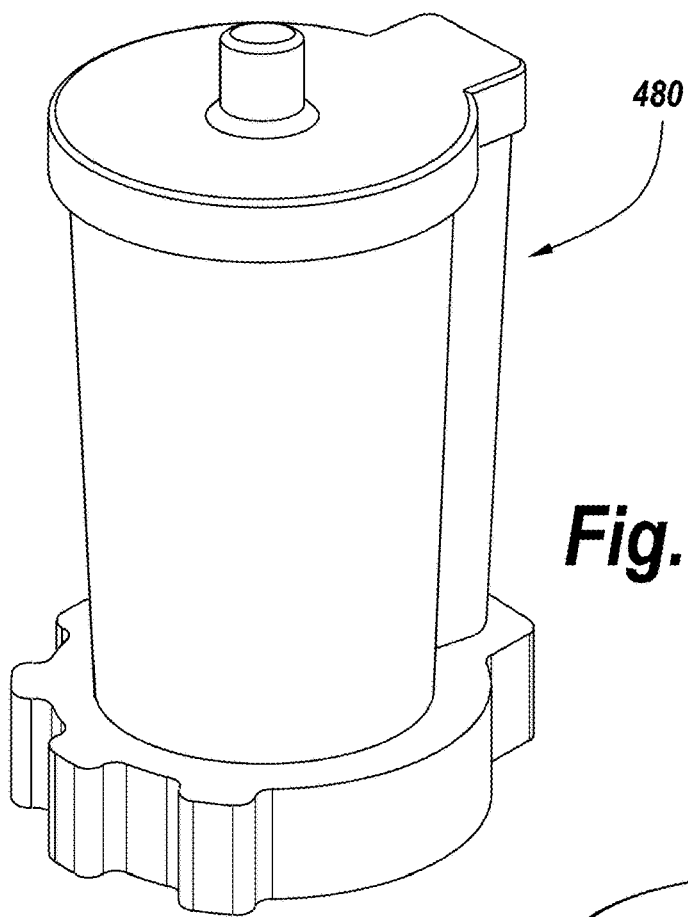
FIG. 4B shows a container with a replaceable bottom having four tabs according to an embodiment of the present disclosure.
Figure 4C:
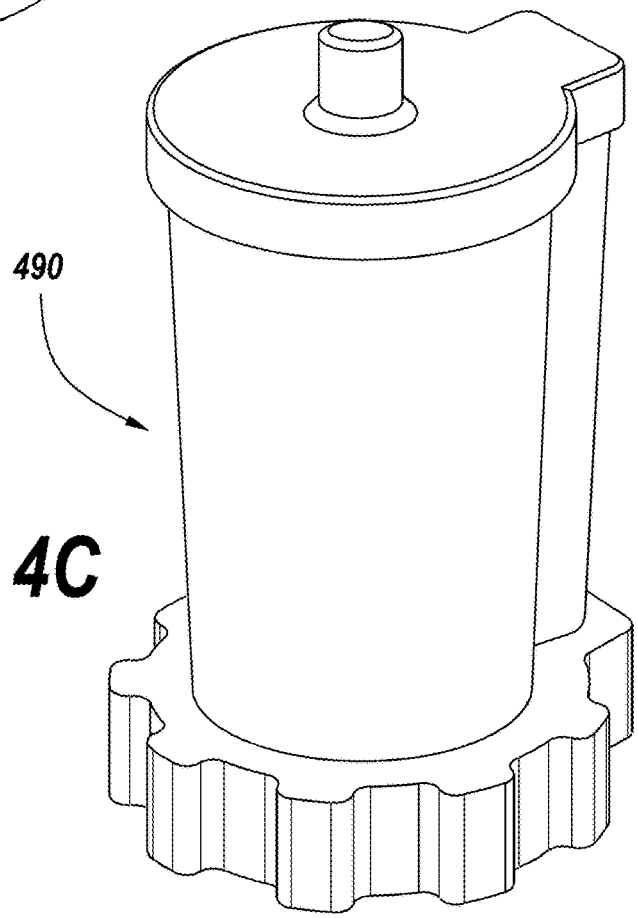
FIG. 4C shows a container system with a replaceable bottom having seven tabs according to an embodiment of the present disclosure.

FIG. 4B shows 4-tab container 480. FIG. 4C shows 7-tab container 490. Either container may be loaded into receiving portion 440. If container 480 is inserted, base receiving portion 440 can recognize the four tabs present. If container 490 is inserted, base 440 can recognize the seven tabs present.

Figure 5B:
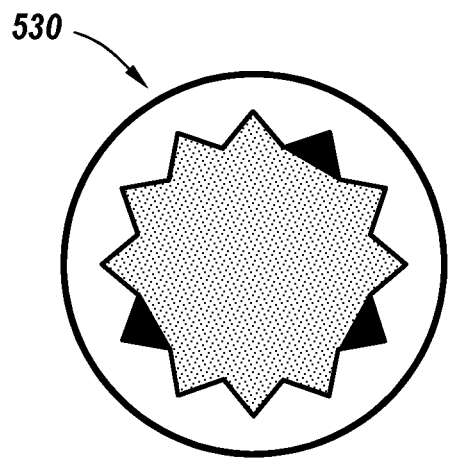
FIGS. 5A-5C show different views of a container system according to an embodiment of the present disclosure with both key-type and code-type systems.
Figure 5A:
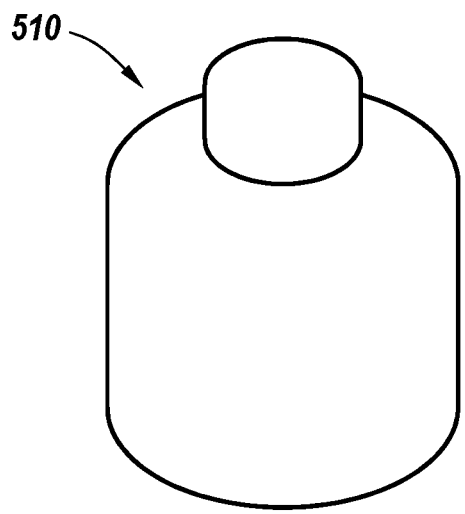
Figure 5C:
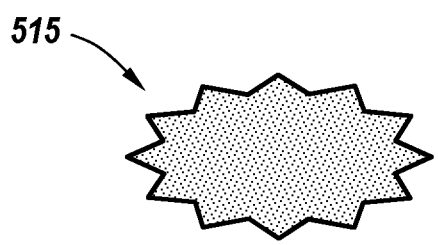

FIGS. 5A-5C show different views of a container system according to an embodiment of the present disclosure. The system includes container 510 that can be placed within receiving position 515, in some embodiments. FIG. 5B shows a base portion 530 of the container 510 with a unique shape having twelve vertices corresponding to receiving position 515. This combination of the unique shape of the base portion 530 along with the corresponding receiving position 515 constitutes a key-type system. Base 530 shows the base of container 510, in this particular example, with the unique shape extending downward from the container 510. The example system illustrated in FIGS. 5A-5C also utilizes a coded-type system based on tabs. Base 530 shows three tabs which constitute an identification code. Thus, the container could only be inserted into a twelve-sided receiving position 515, and the receiving position 515 would register three tabs (i.e. the darkly shaded tabs in the second, fifth, and ninth positions, counting clockwise from the uppermost tab position as the first position). In non-limiting examples, the receiving position 515 could register the three tabs using pressure sensors, haptic sensors, visual or infrared sensors, matching pins, or other physical sensors.

In embodiments where the tray is replaceable, a different tray and set of receiving positions may be retrofitted by the user or by the manufacturer. For example, a user may decide to repurpose an instrument for a set of tests that require more mobile phase containers. For example, tray 110 could be replaced with a tray having five receiving positions. The system could also be provided with additional feed lines to supply the chromatography system from the new solvent containers. Alternatively, a second or subsequent tray maybe added with one or more further receiving positions.

Figure 6:
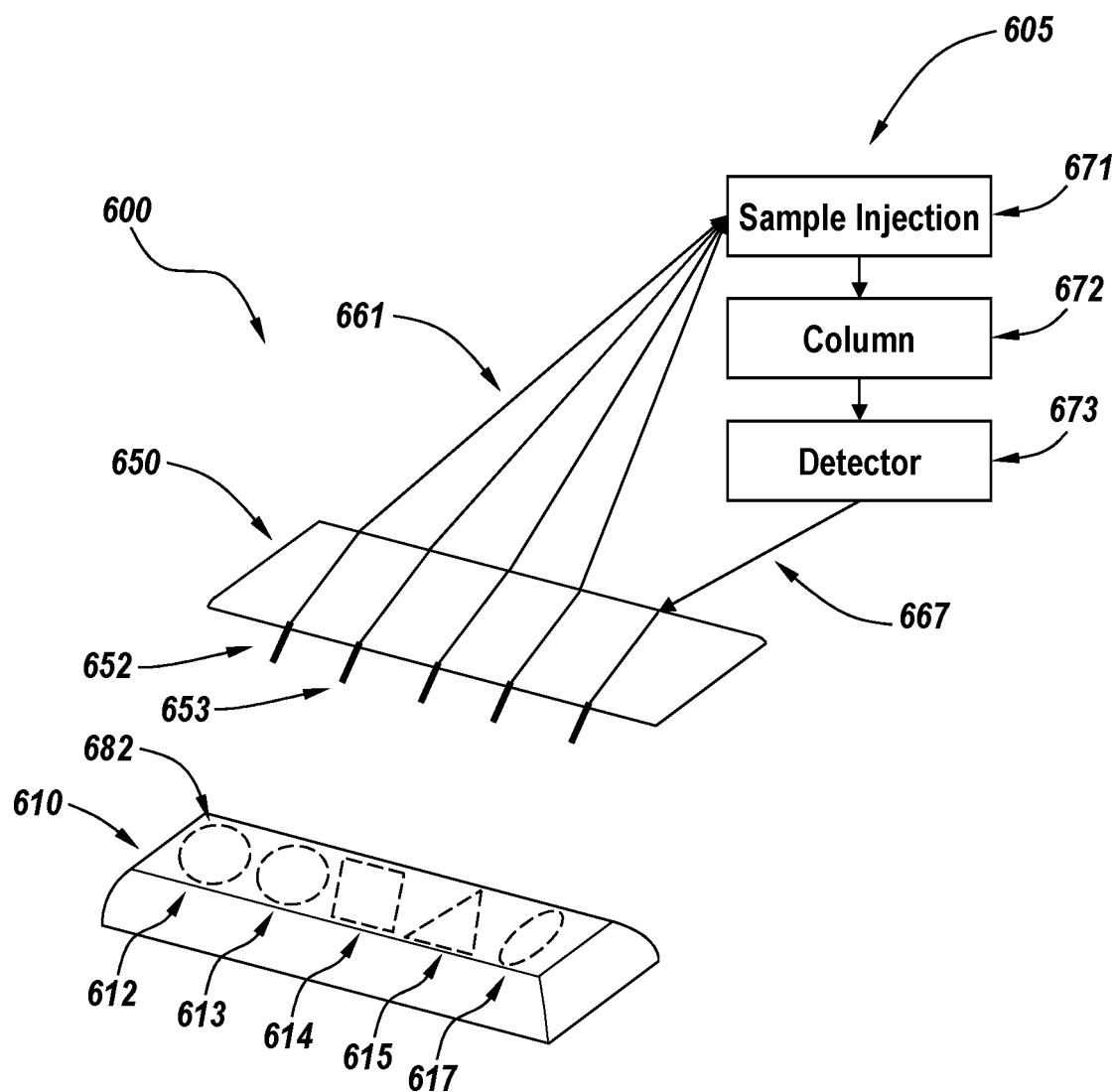
FIG. 6 shows a chromatography system and a container system according to an embodiment of the present disclosure.

In an exemplary embodiment, a solvent container system for a chromatography system may include a high performance liquid chromatography (HPLC) system 605 as depicted in FIG. 6, having a solvent container system 600 according to an embodiment of the present disclosure. Solvent container system 600 has tray 610 with five receiving positions 612, 613, 614, 615, and 617. System 600 may provide Mobile Phase A, Mobile Phase B, wash solvent, rinse solvent, and waste. System 600 is an embodiment in which Mobile Phase A has circular receiving position 612 and Mobile Phase B has circular receiving position 613, such that the same container type can be received by either receiving position. Wash solvent has a square receiving position 614. Rinse solvent has a triangular receiving position 615. Waste has an oval receiving position 617.

Considering a separation which could be performed on HPLC system 605 with solvent container system 600 demonstrates several of the safeguards provides by systems disclosed herein. The receiving positions designated for mobile phase, aqueous solution, wash solvent, and rinse solvent are each provided with a tabbed coding system utilizing seven tab positions, e.g., tabs 682. For example, a user may wish to use HPLC system 605 with solvent container system 600 to separate aldehyde and ketone compounds dissolved in acetonitrile at the ppm level. The user selects a known gradient method for the separation. The user's method calls for Mobile Phase A to be a 10% acetonitrile/90% water (v/v) solution and Mobile Phase B to be a 60% methanol/30% tetrahydrofuran/10% acetonitrile (v/v) solution. The gradient profile is 56-80% B in 15 min, to 100% B in 1 min, hold for 2 min, balance A. A 10% acetonitrile/90% water solution is available in a mobile phase container with a tabbing code having a tab in the first tab position only. A 60% methanol/30% tetrahydrofuran/10% acetonitrile solution is available in a mobile phase container with a tabbing code having a tab in the third position only.

The user places appropriate wash solvent in receiving position 614, rinse solvent in receiving position 615, and a waste container in receiving position 617. The user then wishes to provide Mobile Phase A. In haste, the user obtains a triangular rinse solvent container and attempts to place it in the circular receiving position 612 for Mobile Phase A. The user cannot do so, and realizes the error. The user selects a 10% acetonitrile/90% water mobile phase container and places it in the receiving position 612 for Mobile Phase A. The system determines the tabbing of the container and confirms that the correct solution has been loaded.

The user next wishes to provide Mobile Phase B. The user obtains a mobile phase container with a 100% hexane solvent, which has tabs in the fifth and seventh positions, and places the container in the receiving position 613 for Mobile Phase B. Because the 100% hexane solution is a mobile phase solution available in a circular mobile phase container, the user is able to place the solution in the receiving position 613 for Mobile Phase B. However, the system determines the tabbing of the container and alerts the user that an incorrect solvent has been loaded. The system instructs the user to obtain 60% methanol/30% tetrahydrofuran/10% acetonitrile solution.

The user next locates a 60% methanol/30% tetrahydrofuran/10% acetonitrile container and places the container in the receiving position 613 for Mobile Phase B. The system determines the tabbing of the container and confirms the correct solvent. However, the system also optically determines the volume of solvent remaining in the container and determines that the amount is sufficient for only one run according to the current method. The system alerts the user about the potential shortage. The user chooses to continue the separation.

The user then connects the Mobile Phase A solvent container to the corresponding feed line 652 at the Mobile Phase A receiving position 612. Contemplating the low volume in the Mobile Phase B container, it occurs to the user to place the feed line 653 for Mobile Phase B into the 100% hexane container, which is sitting on the counter. The user physically cannot do this, because feed line 653 is positioned proximate the Mobile Phase B receiving position 613 and can only be connected to a container at receiving position 613. The user connects the Mobile Phase B solvent container to the corresponding feed line 653 at the Mobile Phase B receiving position. The user connects the remaining solvent containers to the corresponding feed lines at each solvent position. The user may then perform the separation using the selected method. In an embodiment provided with an automated mechanism for placing the solvent containers, such as a robotic arm, the automated mechanism, rather than the user, could place each solvent container as described above.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A solvent container system for a chromatography system, wherein the solvent container system comprises:
    a liquid chromatography system;
    a set of coded containers containing one or more solvents for use within the liquid chromatography system, each coded container comprising a container body and an identification code unit providing an identification code having a unique shape indicating a property of a solvent within each coded container, wherein the set of coded containers is configured to supply the one or more solvents to the liquid chromatography system; and one or more receiving positions, each receiving position comprising a reader which reads the identification code.

2. The solvent container system of claim 1, wherein the identification code unit further includes a bar code, a matrix bar code, a radio-frequency identification (RFID) device, a 125 kHz or 13.56 MHz proximity device, or a contact smart chip.

3. The solvent container system of claim 1, wherein the identification code unit is a set of tab positions.

4. The solvent container system of claim 1, wherein the identification code unit is a set of geometric features, wherein the features are defined by one or more of shape, size, color, and position.

5. The solvent container system of claim 1, wherein the liquid chromatography system is configured not to operate if supplied with an incorrect solvent from the set of coded containers.

* * * * *